(12) United States Patent
Fukawa et al.

(10) Patent No.: US 8,287,994 B2
(45) Date of Patent: Oct. 16, 2012

(54) LOW REFLECTION GLASS AND PROTECTIVE PLATE FOR DISPLAY

(75) Inventors: Makoto Fukawa, Tokyo (JP); Kenichi Tanaka, Tokyo (JP); Shinsuke Kaga, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 12/907,071

(22) Filed: Oct. 19, 2010

(65) Prior Publication Data

US 2011/0033679 A1    Feb. 10, 2011

Related U.S. Application Data

(63) Continuation of application No. PCT/JP2009/058134, filed on Apr. 24, 2009.

(30) Foreign Application Priority Data

Apr. 24, 2008    (JP) .................................. 2008-113857

(51) Int. Cl.
    *B32B 7/02*    (2006.01)
(52) U.S. Cl. ......... 428/212; 428/220; 428/432; 428/480
(58) Field of Classification Search .................. 428/212, 428/220, 432, 480
    See application file for complete search history.

(56) References Cited

U.S. PATENT DOCUMENTS

| | | | |
|---|---|---|---|
| 5,691,044 A | 11/1997 | Oyama et al. | |
| 5,871,843 A | 2/1999 | Yoneda et al. | |
| 5,942,319 A | 8/1999 | Oyama et al. | |
| 5,976,684 A | 11/1999 | Oyama et al. | |
| 6,248,448 B1 | 6/2001 | Lippey et al. | |
| 6,344,288 B1 | 2/2002 | Oyama et al. | |
| 6,358,617 B1 | 3/2002 | Ohsaki et al. | |
| 2004/0240093 A1 | 12/2004 | Yoshikawa et al. | |

FOREIGN PATENT DOCUMENTS

| | | |
|---|---|---|
| JP | 09-73001 | 3/1997 |
| JP | 09-156964 | 6/1997 |
| JP | 09-314757 | 12/1997 |
| JP | 10-087348 | 4/1998 |
| JP | 2003-121605 | 4/2003 |
| JP | 2003-215304 | 7/2003 |

OTHER PUBLICATIONS

Yoshikawa et al (JP 2003-121605), Apr. 23, 2003.*

* cited by examiner

*Primary Examiner* — Maria Veronica Ewald
*Assistant Examiner* — Lawrence Ferguson
(74) *Attorney, Agent, or Firm* — Oblon, Spivak, McClelland, Maier & Neustadt, L.L.P.

(57) ABSTRACT

Provided is a low reflection glass excellent in the abrasion resistance, the weather resistance, the productivity and the outer appearance, and a protective plate for a display. A low reflection glass includes a glass substrate and an antireflection film formed on the surface of the glass substrate. The antireflection film comprises an interlayer and an outermost layer in this order from the glass substrate side; and the outermost layer is a layer containing Si atoms, C atoms and O atoms. The content of C atoms is from 0.5 to 3 mol % based on 100 mol % of the total amount of Si atoms, C atoms and 0 atoms. The interlayer is a layer (a) (high refractive index layer) or a layer (b) (light absorbing layer). A protective plate for a display comprises a support substrate comprising the low reflection glass and a conductive film provided on a side on which no antireflection film is formed of the support substrate.

8 Claims, 9 Drawing Sheets

LOW REFLECTION GLASS AND PROTECTIVE PLATE FOR DISPLAY

TECHNICAL FIELD

The present invention relates to a low reflection glass and a protective plate for a display.

BACKGROUND ART

A low reflection glass on the surface of which reflection of light is suppressed, is used as a protective plate for a display, a cover glass for a solar battery, glass for an automobile, glass for a railway vehicle, glass for shipping, glass for a building material, etc.

As such a low reflection glass, for example, the following has been proposed.

(1) A low reflection glass having a resin antireflection film bonded to the surface of a glass substrate (Patent Document 1).

(2) A low reflection glass having an antireflection film formed by a sputtering method on the surface of a glass substrate (Patent Documents 2 to 5).

However, the low reflection glass (1) has the following problems.

(i) As the antireflection film is a resin film, the surface abrasion resistance is low.

(ii) As the antireflection film is a resin film, the weather resistance is low.

(iii) As the antireflection film should be bonded, the productivity is low.

(iv) As the bonded antireflection film is made of a resin, flatness of the resin surface is limited, thus leading to poor outer appearance.

With respect to the low reflection glass (2), the problems (i) to (iv) of the low reflection glass (1) are solved to a certain extent, but the surface abrasion resistance and the productivity are still insufficient.

Further, Patent Document 5 discloses application of $SiC_xO_y$ (wherein x is from 0.1 to 3 and y is from 0.1 to 3) as a material of a low refractive index film. However, it failed to disclose use of the low refractive index film as an outermost layer. If the low refractive index film is not the outermost layer, the antireflection performance tends to be decreased.

Patent Document 1: JP-A-09-314757
Patent Document 2: JP-A-09-156964
Patent Document 3: JP-A-10-087348
Patent Document 4: JP-A-2003-215304
Patent Document 5: JP-A-2003-121605

DISCLOSURE OF THE INVENTION

Object to be Accomplished by the Invention

The present invention provides a low reflection glass excellent in the abrasion resistance, the weather resistance, the productivity and the outer appearance and a protective plate for a display.

Means to Accomplish the Object

The low reflection glass of the present invention is a low reflection glass comprising a glass substrate and an antireflection film formed on the surface of the glass substrate, wherein the antireflection film comprises an interlayer and an outermost layer disposed in this order from the glass substrate side; and the outermost layer is a layer containing Si atoms, C atoms and O atoms, the content of C atoms being from 0.5 to 3 mol % based on 100 mol % of the total amount of Si atoms, C atoms and O atoms, and the interlayer is the following layer (a) or layer (b):

layer (a): a layer having an extinction coefficient $K_1$ at a wavelength of from 380 to 780 nm of $0 \leq K_1 < 0.1$ and a refractive index $n_1$ at a wavelength of 550 nm of $2.0 \leq n_1 \leq 2.5$;

layer (b): a layer having an extinction coefficient $K_2$ at a wavelength of from 380 to 780 nm of $0.1 \leq K_2 \leq 2.4$ and a refractive index $n_2$ at a wavelength of from 380 to 780 nm of $0.5 \leq n_2 \leq 2.5$, and $K_{2p} < K_{2q}$ and $n_{2p} > n_{2q}$ being satisfied, where the extinction coefficients $K_2$ at wavelengths of p and q which satisfy 380 nm $\leq p < q \leq$ 780 nm are $K_{2p}$ and $K_{2q}$, respectively, and the refractive indices $n_2$ at wavelengths of p and q are $n_{2p}$ and $n_{2q}$, respectively.

The protective plate for a display of the present invention comprises the low reflection glass of the present invention.

The protective plate for a plasma display of the present invention comprises a support substrate comprising the low reflection glass of the present invention, and a conductive film provided on a side on which no antireflection film is formed of the support substrate.

Effects of the Invention

According to the present invention, a low reflection glass excellent in the abrasion resistance, the weather resistance, the productivity and the outer appearance is obtained, which can be utilized for a protective plate for a display, etc.

BEST MODE FOR CARRYING OUT THE INVENTION

<Low Reflection Glass>

Figure 1:
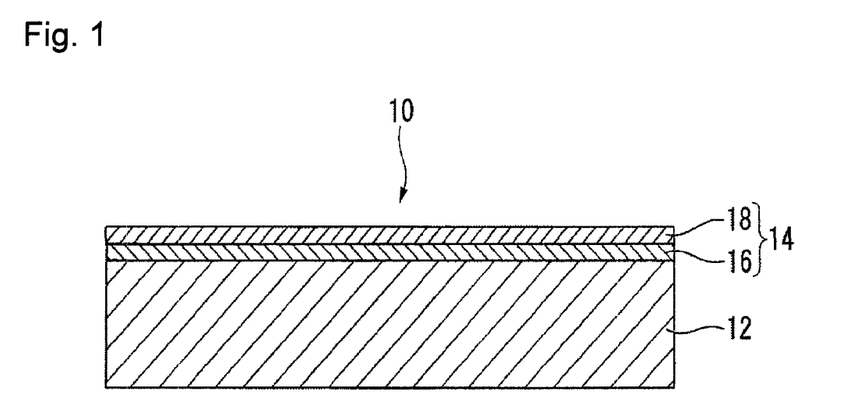
FIG. 1 is a cross-sectional view illustrating one example of a low reflection glass of the present invention.

FIG. 1 is a cross-sectional view illustrating one example of a low reflection glass of the present invention. A low reflection glass 10 comprises a glass substrate 12 and an antireflection film 14 formed on the surface of the glass substrate 12.

(Glass Substrate)

As a material of the glass substrate 12, soda lime silica glass, borosilicate glass, aluminosilicate glass may, for example, be mentioned. Further, the glass substrate 12 may be a tempered glass substrate such as an air-cooled tempered glass or chemically tempered glass or may be a raw glass substrate not tempered.

The thickness of the glass substrate 12 is preferably from 0.1 to 15 mm, more preferably from 1.0 to 5.0 mm, particularly preferably from 2.5 to 3.5 mm. The thickness of the glass substrate is preferably at least 0.1 mm, more preferably at least 1.0 mm, whereby the glass substrate has practical rigidity. Further, it is preferably at most 15 mm, more preferably at most 5.0 mm, whereby the glass substrate has practical lightness.

(Antireflection Film)

The antireflection film 14 comprises an interlayer 16 and an outermost layer 18 in this order from the glass substrate 12 side.

The outermost layer 18 is a layer located farthest from the glass substrate and is a layer located on the outermost side. Further, the outermost layer 18 is a layer containing Si atoms, C atoms and O atoms. Specifically, it is preferably a layer containing $SiO_2$ as the main component and containing C atoms. The outermost layer 18 may contain other elements other than Si atoms, C atoms and O atoms within a range not to impair the optical properties.

The content of C atoms is from 0.5 to 3.0 mol %, preferably from 0.5 to 2.0 mol %, more preferably from 1.0 to 1.8 mol % based on 100 mol % of the total amount of Si atoms, C atoms and O atoms. When the concentration of C atoms is at least 0.5 mol %, a low reflection glass excellent in the abrasion resistance and excellent in the outer appearance with few defects can be obtained. Further, an excellent productivity is also achieved since the film deposition rate can be made high. When the content of C atoms is at most 3 mol %, the refractive index will be less than 1.5, whereby excellent antireflection effect and excellent abrasion resistance will be obtained. It is not clearly understood how the C atoms are contained in the outermost layer 18, however, it is considered that the C atoms are contained in a state where they are chemically bonded to Si atoms or O atoms or in a state where the C atoms are present by themselves in gaps between $SiO_2$ lattices.

The outermost layer 18 of the antireflection film 14 preferably contains $SiO_2$ as the main component. Further, $SiO_2$ in the outermost layer 18 in the present invention may contain a structure deficient in some of O atoms in $SiO_2$. The content of Si atoms and O atoms in the outermost layer 18 in the present invention is preferably from 97.01 to 99.5 mol %, more preferably from 98.0 to 99.5 mol %, furthermore preferably from 98.2 to 99.0 mol % as calculated as $SiO_2$ without deficiency of O atoms. When the $SiO_2$ content is at least 97.0 mol %, the refractive index will be less than 1.5, whereby excellent antireflection effect will be obtained. When the $SiO_2$ content is at most 99.5 mol %, the abrasion resistance and the productivity will be improved.

The C atom content in the outermost layer 18 is measured by the following method.

First, measurement is carried out by using a quadrupole type secondary ion mass spectrometer (SIMS). Specifically, the SIMS depth profile of the concentration of each of Si atoms, C atoms and O atoms relative to the depth of the outermost layer 18, components of the layer adjacent to the outermost layer and components of the substrate is prepared, and the average ($I_i$) of the ion intensity of C atoms from a depth of 4 nm to the depth at which the profile of the components of the layer adjacent to the outermost layer appears in the SIMS depth profile, is calculated. As the primary ion species, $Cs^+$ (cesium cation) is employed.

Further, the content of C atoms is calculated from the following formula (1):

$$C \text{ atom content} = (I_i/I_{ref}) \times RSF \quad (1)$$

In the above formula (1), the intensity of O atoms in a glass substrate of which the O atom content is known, is regarded as the reference ($I_{ref}$) (normalized by the O atom intensity).

Further, with respect to a sample of which the C atom content is known (content: Z mol %), RSF is calculated by the following formula (2) from the ion intensity ($I_{iZ}$) of C atoms obtained by SIMS and the intensity ($I_{ref}$) of O atoms in the glass substrate:

$$RFS = (Z/I_{iZ}) \times I_{ref} \quad (2)$$

First, a sample is subjected to measurement by usual negative detection, and with respect to a sample of which the obtained C atom content is at most 1 mol %, the content is regarded as the C atom content.

In the above negative detection, in a case where the C atom content exceeds 1%, reliability of the obtained data is low. Accordingly, with respect to a sample of which the content exceeds 1 mol % and is at most 5 mol %, the ion intensity of C atoms is measured by the same method as the above measurement employing SIMS except that positive detection is employed, to calculate the C atom content.

In the measurement by the above positive detection employing SIMS, in a case where the C atom content exceeds 5 mol %, the reliability of the obtained data is low, and accordingly with respect to a sample of which the content exceeds 5 mol %, the C atom content is measured by X-ray photoelectron spectroscopy (XPS).

The outermost layer 18 preferably has a refractive index at a wavelength of 550 nm of at least 1.45 and less than 1.5. When the refractive index of the outermost layer 18 is at least 1.45, in a case where $SiO_2$ is contained as the main component, a dense $SiO_2$ film not having a porous structure can be obtained, whereby sufficient strength will be obtained. When the refractive index of the outermost layer 18 is less than 1.5, an excellent antireflection effect will be obtained.

The refractive index of the outermost layer 18 in the present invention is measured by using a spectral ellipsometer (manufactured by J.A. Woollam Co., Inc., apparatus name: VASE) at an incident angle of 70°.

The physical film thickness (hereinafter referred to simply as the film thickness) of the outermost layer 18 in the present invention is preferably from 70 to 140 nm, more preferably from 80 to 135 nm. When the film thickness of the outermost layer 18 is within this range, it is possible to weaken the reflected light by interference at a wavelength of from 380 nm to 780 nm in the visible region.

Further, since the reflected light is weakened by interference as described above by the antireflection film in the present invention, the preferred film thickness of the outermost layer 18 varies depending on the material of the interlayer 16. In a case where the interlayer 16 is the layer (a), the outermost layer 18 is preferably from 100 to 135 nm, more preferably from 110 to 130 nm. Further, in a case where the interlayer 16 is the layer (b), the outermost layer 18 is preferably from 70 to 100 nm, more preferably from 75 to 95 nm.

The film thickness of the outermost layer 18 is measured by using a spectral ellipsometer (manufactured by J.A. Woollam Co., Inc., apparatus name: VASE) at an incident angle of 70°.

In the low reflection glass 10 of the present invention, the antireflection effect will be obtained by combining the outermost layer 18 and the interlayer 16.

The interlayer 16 in the present invention is the following layer (a) or layer (b). The interlayer 16 is formed so as to be located between the glass substrate and the outermost layer.

layer (a): a layer having an extinction coefficient $K_1$ at a wavelength of from 380 to 780 nm of $0 \leq K_1 < 0.1$ and a refractive index $n_1$ at a wavelength of 550 nm of $2.0 \leq n_1 \leq 2.5$;

layer (b): a layer having an extinction coefficient $K_2$ at a wavelength of from 380 to 780 nm of $0.1 \leq K_2 \leq 2.4$ and a refractive index $n_2$ at a wavelength of from 380 to 780 nm of $0.5 \leq n_2 \leq 2.5$, and $K_{2p} < K_{2q}$ and $n_{2p} > n_{2q}$ being satisfied, where the extinction coefficients $K_2$ at wavelengths of p and q which satisfy 380 nm$\leq$p$<$q$\leq$780 nm are $K_{2p}$ and $K_{2q}$, respectively, and the refractive indices $n_2$ at wavelengths of p and q are $n_{2p}$ and $n_{2q}$, respectively.

The refractive index of the layer (a) at a wavelength of 550 nm is more preferably from 2.2 to 2.5, furthermore preferably from 2.3 to 2.5. That is, the layer (a) is a high refractive index layer having a high refractive index material.

Further, the extinction coefficient $K_1$ of the layer (a) at a wavelength of from 380 to 780 nm is more preferably from 0 to 0.05.

The refractive index and the extinction coefficient of the interlayer 16 in the present invention are measured by using a spectral ellipsometer (manufactured by J.A. Woollam Co., Inc., apparatus name: VASE) at an incident angle of 70°.

In a case where the interlayer 16 in the present invention is the layer (a), by the extinction coefficient $K_1$ being within the above range, there is substantially no absorption of the visible light in the layer (a), whereby the transmittance of the low reflection glass of the present invention can be made high. Further, by the refractive index $n_1$ being at least 2.0, the reflectance of the low reflection glass of the present invention can be made low. As the reason, since the outermost layer 18 in the low reflection glass in the present invention is a layer containing Si atoms and O atoms, it is a low refractive index layer. Further, by applying, as the interlayer disposed on the substrate side from the outermost layer 18, the layer (a) having a refractive index of at least 2.0, reflected light can be weakened by the interference of light, whereby the reflectance of the low reflective glass of the present invention can be made low. Further, the reflectance of the low reflection glass in the present invention means the luminous reflectance on one side on which the antireflection film 14 is formed against light at a wavelength of from 480 to 780 nm. Further, the upper limit of the refractive index of the layer (a) is regarded as 2.5 since there is no practical material having a refractive index exceeding 2.5 at present.

The luminous reflectance in the present invention is a reflectance obtained by measuring the spectral reflectance in accordance with JIS R3106 1999 and calculating the weighted average by the weighting coefficient in appendix 1, and is preferably from 0.1 to 3%, more preferably from 0.1 to 1%.

A material to be used for the layer (a) may, for example, be a material (hereinafter referred to as $TiO_y$) containing Ti atoms and O atoms as the main components, the proportion of Ti atoms and O atoms being $TiO_y$ (y=1.9 to 2.0) (extinction coefficient: at least 0 and less than 0.1, refractive index: 2.2 to 2.5);

a material (hereinafter referred to as $NbO_z$) containing Nb atoms and O atoms as the main components, the proportion of Nb atoms and O atoms being $NbO_z$ (z=1 to 3) (extinction coefficient: at least 0 and less than 0.1, refractive index: 2.25);

a material (hereinafter referred to as $SiN_t$) containing Si atoms and N atoms as the main components, the proportion of Si atoms and N atoms being $SiN_t$ (t=1.2 to 1.4) (extinction coefficient: at least 0 and less than 0.1, refractive index: 2.0 to 2.2);

a material (hereinafter referred to as $TaO_u$) containing Ta atoms and O atoms as the main components, the proportion of Ta atoms and O atoms being $TaO_u$ (U=1 to 3) (extinction coefficient: at least 0 and less than 0.1, refractive index: 2 to 2.3); or a material (hereinafter referred to as $ZrO_v$) containing Zr atoms and O atoms as the main components, the proportion of Zr atoms and O atoms being $ZrO_v$ (v=1.9 to 2.0) (extinction coefficient: at least 0 and less than 0.1, refractive index: 2 to 2.3).

Further, the main component means that the amount of the corresponding element (for example, in the case of $TiO_y$, the total number of moles of Ti atoms and O atoms) based on the number of moles of all the atoms in the layer (a) is at least 90 mol %, more preferably at least 95 mol %, furthermore preferably at least 98 mol %, most preferably at least 99 mol %.

The material of the layer (a) in the present invention is preferably $TiO_y$ or $NbO_z$, more preferably $TiO_y$, in view of high refractive index, thus making the reflectance of the low reflection glass of the present invention sufficiently low.

The layer (b) in the present invention is a layer having an extinction coefficient $K_2$ at a wavelength of from 380 to 780 nm of $0.1 \leq K_2 \leq 2.4$ and a refractive index $n_2$ at a wavelength of from 380 to 780 nm of $0.5 \leq n_2 \leq 2.5$, and $K_{2p} < K_{2q}$ and $n_{2p} > n_{2q}$ being satisfied, where the extinction coefficients $K_2$ at wavelengths of p and q which satisfy 380 nm$\leq$p$<$q$\leq$780 nm are $K_{2p}$ and $K_{2q}$, respectively, and the refractive indices $n_2$ at wavelengths of p and q are $n_{2p}$ and $n_{2q}$, respectively. That is, the layer (b) is a light absorbing layer having a light absorbing material.

In a case where the interlayer 16 in the present invention is the layer (b), by the extinction coefficient $K_2$ and the refractive index $n_2$ being within the above ranges and satisfying the above relations, the reflectance of the low reflection glass of the present invention can be made low. This is because by combining the outermost layer 18 containing Si atoms and O atoms and the layer (b) having the above extinction coefficient and refractive index, the reflected light can be weakened by interference of light, whereby the reflectance of the low reflection glass of the present invention can be made low. Further, since the layer (b) has properties to absorb visible light, it can absorb a larger quantity of reflected light, and as a result, the reflectance against the external light can be made lower. Accordingly, when the low reflection glass of the present invention is used as a protective plate for a display, high visibility for an image can be obtained.

A material which satisfies the above extension coefficient $K_2$ and refractive index $n_2$ to be used for the layer (b) in the present invention is preferably a material containing Ti atoms and N atoms as the main components, the proportion of Ti atoms and N atoms being $TiN_x$ (X=0.5 to 1.0) (extinction coefficient: 0.9 to 2.2, refractive index: 1.5 to 2.5). $TiN_x$ is preferred as the material of the layer (b) since the extinction coefficient and the refractive index of $TiN_x$ are optimum in a case of forming a film having antireflection performance in combination with $SiO_2$ of the outermost layer 18.

Further, the main component means that the amount of the corresponding element (for example, in the case of $TiN_x$, the number of moles of Ti atoms and N atoms) based on the number of moles of all the atoms in the layer (b) is at least 90 mol %, more preferably at least 95 mol %, furthermore preferably at least 98 mol %, most preferably at least 99 mol %. The layer (b) may further contain O atoms in addition to Ti atoms and N atoms.

The film thickness of the interlayer 16 varies depending on the material of the interlayer 16 and the entire structure of the antireflection film.

For example, the film thickness of the layer (a) is preferably from 10 to 65 nm, more preferably from 10 to 30 nm, furthermore preferably from 10 to 20 nm. When the film thickness of the layer (a) is within this range, the low reflection glass of the present invention can weaken reflected light by interference at a wavelength of from 380 nm to 780 nm in the visible region. Within the more preferred range, or within the furthermore preferred range, the layer of a high refractive index material which usually has a low film deposition rate can be made thin, whereby the time required for film deposition of the entire antireflection film of the present invention can be shortened and as a result, the low reflection glass of the present invention can be produced with high productivity.

Further, the film thickness of the layer (b) is preferably from 5 to 25 nm, more preferably from 5 to 12 nm, furthermore preferably from 7 to 12 nm. When the film thickness of the layer (b) is within this range, the low reflection glass of the present invention can weaken the reflected light by interference at a wavelength of from 380 to 780 nm in the visible region.

The low reflection glass of the present invention has an excellent antireflection effect by applying the layer (a) as a high refractive index layer or the layer (b) as a light absorbing layer as the interlayer 16 in combination with the outermost layer 18 having a low refractive index. Further, by using, as the material of the outermost layer 18, a material containing Si atoms, O atoms and C atoms and containing the C atoms in a specific ratio, the outermost layer 18 can be a layer having a low refractive index and being hard. As a result, the low reflection glass of the present invention can achieve both two effects of excellent antireflection performance and excellent abrasion resistance.

The low reflection glass of the present invention may contain other layer as the case requires. Such other layer may, for example, be a middle refractive index layer: a layer having a refractive index at a wavelength of 550 nm of at least 1.5 and less than 2.0, or a low refractive index layer: a layer having a refractive index at a wavelength of 550 nm of at least 1.45 and less than 1.5.

A material having a refractive index of at least 1.5 and less than 2.0 to be used for the middle refractive index layer may, for example, be SiO (extinction coefficient: 0 to 0.5, refractive index: 1.7 to 1.97), $AlO_s$ (s=1 to 2) (extinction coefficient: 0 to 0.1, refractive index: 1.5 to 1.7), $Y_2O_3$ (extinction coefficient: 0 to 0.1, refractive index: 1.87 or $La_2O_3$ (extinction coefficient: 0 to 0.1, refractive index: 1.85).

A material having a refractive index of at least 1.45 and less than 1.5 to be used for the low refractive index layer may, for example, be $SiO_2$ (refractive index: 1.46) or $MgF_2$ (refractive index: 1.38).

The low reflection glass of the present invention may contain only one interlayer or two or more interlayers. In a case where it contains two or more interlayers, the respective interlayers may be layers made of different materials, or all the layers may be layers made of the same material. Further, the thicknesses of the respective interlayers may be all the same or may be different.

With respect to other layers, the low reflective glass may contain only one layer or two or more layers.

Further, the antireflection film of the present invention may contain e.g. a barrier layer having substantially no optical function. The barrier layer is a layer to be provided on the surface of the layer (a) or the layer (b) for the purpose of preventing the layer (a) or the layer (b) from being damaged even after a high temperature process such as a tempering step or a bending step after film deposition. In order that the barrier layer may have substantially no optical function, the film thickness of the barrier layer is preferably from 0.1 to 10 nm. A material of the barrier layer may, for example, be SiN, Ti or Cr.

Figure 2:
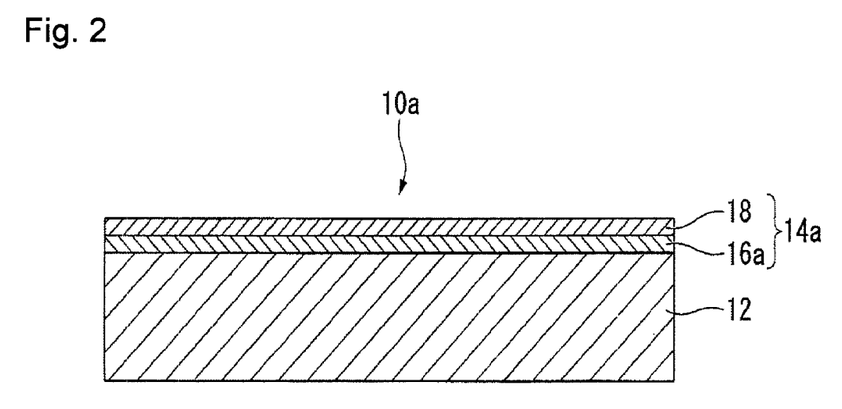
FIG. 2 is a cross-sectional view illustrating a preferred embodiment of a low reflection glass of the present invention.

FIG. 2 is a cross-sectional view illustrating a preferred embodiment of a low reflection glass of the present invention. A low reflection glass 10a comprises a glass substrate 12 and an antireflection film 14a formed on the surface of the glass substrate 12, wherein the antireflection film 14a is a film having a layer (a) 16a and an outermost layer 18 laminated in this order from the glass substrate 12 side. That is, it is a low reflection glass 10a having a structure of glass substrate 12/layer (a) 16a/outermost layer 18.

Figure 3:
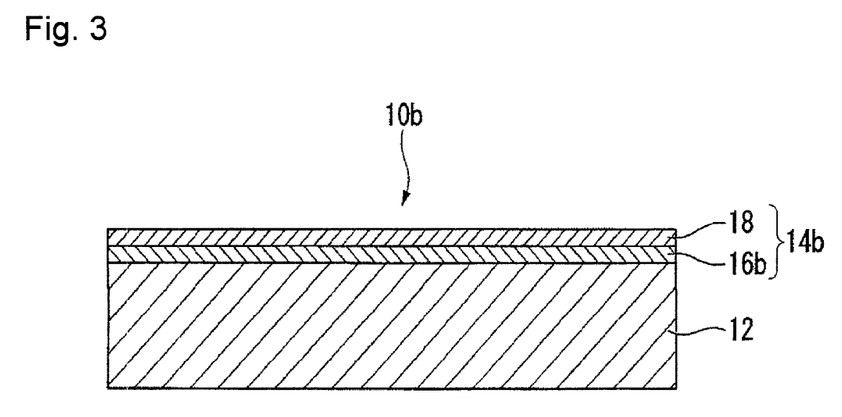
FIG. 3 is a cross-sectional view illustrating another preferred embodiment of a low reflection glass of the present invention.

FIG. 3 is a cross-sectional view illustrating another preferred embodiment of a low reflection glass of the present invention. A low reflection glass 10b comprises a glass substrate 12 and an antireflection film 14b formed on the surface of the glass substrate 12, wherein the antireflection film 14b is a film having a layer (b) 16b and an outermost layer 18 laminated in this order from the glass substrate 12 side. That is, it is a low reflection glass 10b having a structure of glass substrate 12/layer (b) 16b/outermost layer 18.

Figure 4:
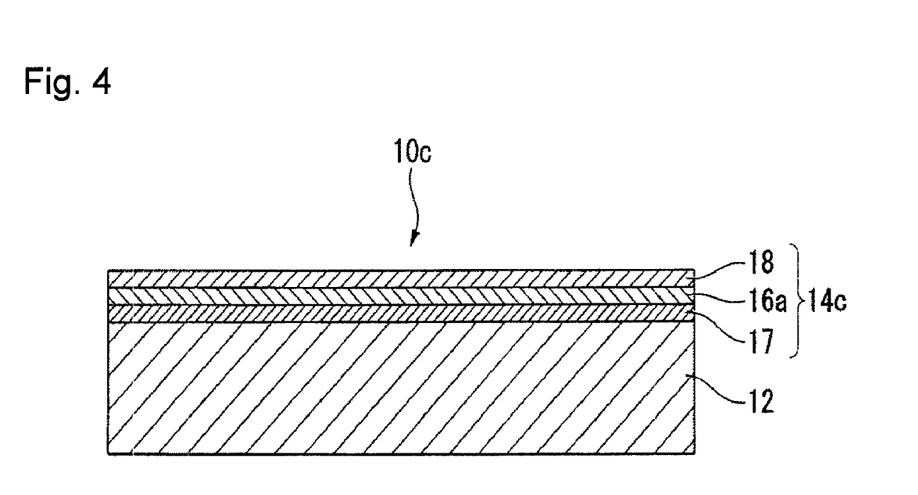
FIG. 4 is a cross-sectional view illustrating another preferred embodiment of a low reflection glass of the present invention.

FIG. 4 is a cross-sectional view illustrating another preferred embodiment of a low reflection glass of the present invention. A low reflection glass 10c comprises a glass substrate 12 and an antireflection film 14c formed on the surface of the glass substrate 12, wherein the antireflection film 14c is a film having a middle refractive index layer 17, a layer (a) 16a and an outermost layer 18 laminated in this order from the glass substrate 12 side. That is, it is a low reflection glass 10c having a structure of glass substrate 12/middle refractive index layer 17/layer (a) 16a/outermost layer 18.

Figure 5:
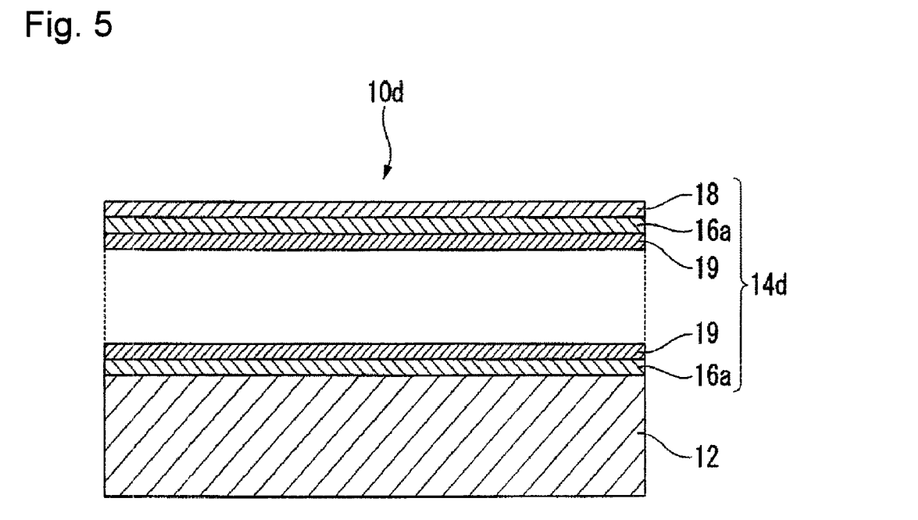
FIG. 5 is a cross-sectional view illustrating another preferred embodiment of a low reflection glass of the present invention.

FIG. 5 is a cross-sectional view illustrating another preferred embodiment of a low reflection glass of the present invention. The low reflection glass 10d comprises a glass substrate 12 and an antireflection film 14d formed on the surface of the glass substrate 12, wherein the antireflection film 14d is a film having layers (a) 16a and low refractive index layers 19 alternately laminated (2m+1) times (wherein m is an integer of at least 1) in this order from the glass substrate 12 side and having an outermost layer 18 on the surface of the layer (a) 16a farthest from the glass substrate 12. That is, it is a low reflection glass 10d having a structure of glass substrate 12/[layer (a) 16a/low refractive index layer 19]$_m$/layer (a) 16a/outermost layer 18.

In this case, the value of m is preferably 1 or 2 from the viewpoint of productivity and economical efficiency, in a case where the low reflection glass of the present invention is used for a protective plate for a display.

The combination of the material, the film thickness, etc. of the antireflection film 14 is not particularly limited so long as the luminous reflectance on one side on which the antireflection film 14 is formed of the low reflection glass 10 of the present invention is lower than the reflectance on the surface of the glass substrate 12. The luminous reflectance on one side on which the antireflection film 14 is formed of the low refractive index glass 10 of the present invention is preferably from 0 to 2.0%, more preferably from 0.1 to 1.5%, furthermore preferably from 0.5 to 0.9% on average against light at a wavelength of from 480 to 780 nm.

(Process for Producing Low Reflection Glass)

The low reflection glass 10 is produced by forming the interlayer 16 on the glass substrate 12 and then forming the outermost layer 18. As the case requires, other layer or the barrier layer is formed before or after the interlayer 16 is formed.

As a method of forming the interlayer 16 and the outermost layer 18, a sputtering method, a vacuum deposition method, an ion plating method, a chemical vapor deposition method may, for example, be mentioned, and a sputtering method is preferred in view of favorable stability in quality and properties, and in view of uniform formation of the interlayer 16 and the outermost layer 18 on a large area glass substrate surface with good productivity.

As the sputtering method, a DC sputtering method, a pulse sputtering method or an AC sputtering method may, for example, be mentioned.

In a case where the interlayer 16 is the layer (a) ($TiO_y$), formation of the interlayer 16 by the sputtering method is carried out, for example, as follows.

While a mixed gas of Ar and $O_2$ is introduced into a chamber of a sputtering apparatus, DC magnetron sputtering is carried out by using a Ti metal target to form the layer (a) on the glass substrate 12.

In a case where the interlayer 16 is the layer (b) ($TiN_x$), formation of the interlayer 16 by the sputtering method is carried out, for example, as follows.

While a mixed gas of Ar and $N_2$ is introduced into a chamber of a sputtering apparatus, DC magnetron sputtering is carried out by using a Ti metal target to form the layer (b) on the glass substrate 12.

Formation of the outermost layer 18 by the sputtering method is carried out, for example, as follows.

While a gas containing $CO_2$ is introduced into a chamber of a sputtering apparatus, AC magnetron sputtering is carried out by using a target containing Si as the main component to form the outermost layer 18 on the interlayer 16. As the gas containing $CO_2$, a gas of $CO_2$ alone or a mixed gas of Ar and $CO_2$ may, for example, be mentioned.

It is preferred to carry out formation of the outermost layer 18 in the present invention by the sputtering method by using a gas containing $CO_2$, whereby the film deposition rate is high, thus leading to an excellent productivity.

The optimum flow ratio ($Ar/CO_2$) of the Ar gas to the $CO_2$ gas in the mixed gas varies depending on the power density at the time of sputtering. At a practical power density, the flow ratio (volume ratio) ($Ar/CO_2$) is preferably $(0/10)<(Ar/CO_2) \leq (3/7)$, more preferably $(1/9) \leq (Ar/CO_2) \leq (3/7)$, furthermore preferably $(2/8) \leq (Ar/CO_2) \leq (3/7)$. When the value of ($Ar/CO_2$) is within this range, the content of C atoms in the film will be proper.

Further, in the mixed gas of Ar and $CO_2$, the lower the ratio of $CO_2$, the higher the content of C atoms in the film tends to be.

Further, formation of the outermost layer 18 by the sputtering method may also be carried out as follows.

While an Ar gas is introduced into a chamber of a sputtering apparatus, AC magnetron sputtering is carried out by using a SiC target to form the outermost layer 18 on the interlayer 16.

In a case where the outermost layer 18 in the present invention is formed by the sputtering method, in a state where the outermost layer 18 after film deposition is exposed to the air, the abrasion resistance of the outermost layer 18 tends to increase with time. The reason is not necessarily clear, but is considered that a very small amount of impurities in the air are attached to the surface of the outermost layer 18, whereby the sliding properties are improved, thus improving the abrasion resistance. However, this has substantially no influence over the transmittance or reflection properties of visible light which are optical properties. That is, the above optical properties are substantially not changed with time after film deposition.

In a case where the low reflection glass 10 of the present invention is applied to a protective plate for a display for example, immediately after the outermost layer 18 is formed by the sputtering method, the outermost layer 18 is kept in a state where it is substantially shut out from the air in some cases. The state where it is shut out from the air may, for example, be a state where a plurality of low reflection glasses 10 are overlaid by means of microfine beads. In a state where it is substantially shut out from the air, the abrasion resistance of the outermost layer 18 will not substantially be improved with time after film deposition. When the low reflection glass 10 as shut out from the air is treated in the next step, the outermost layer 18 in substantially the same state as immediately after the film deposition is subjected to the next step. Accordingly, in order to prevent the outermost layer 18 from being damaged by treatment in the next step, an excellent abrasion resistance immediately after film deposition is important. Further, in a case where the low reflection glass 10 of the present invention is used as a protective plate for a display, after the low reflection glass 10 is assembled into a display, it is always exposed to the air, and accordingly a high abrasion resistance after time passes after the film deposition is also important.

In the above-described low reflection glass 10, the outermost layer 18 is a layer containing Si atoms, C atoms and O atoms, and the content of C atoms is from 0.5 to 3 mol % based on 100 mol % of the total amount of Si atoms, C atoms and O atoms, and accordingly the low reflection glass 10 is excellent in the antireflection effect, excellent in the surface abrasion resistance and excellent in the productivity.

Further, the above-described low reflection glass 10 of the present invention is excellent in the weather resistance, the productivity and the outer appearance as compared with a conventional low reflection glass having an antireflection film bonded.

<Protective Plate for Display>

The protective plate for a display of the present invention comprises a low reflection glass of the present invention. Further, depending on the type of the display to which the protective plate is attached, the display may further have a film having other function required therefor.

<Protective Plate for Plasma Display>

The protective plate for a plasma display (hereinafter referred to as a protective plate) of the present invention comprises a support substrate comprising the low reflection glass of the present invention and a conductive film provided on a side on which no antireflection film is formed of the support substrate. The conductive film may be directly formed on the surface of the support substrate, or an electroconductive film having the conductive film laminated on the surface of a resin film may be bonded on the surface of the support substrate. The protective plate of the present invention may further have a film having near infrared shielding function, a film having a color tone correcting function, or the like.

First Embodiment

Figure 6:
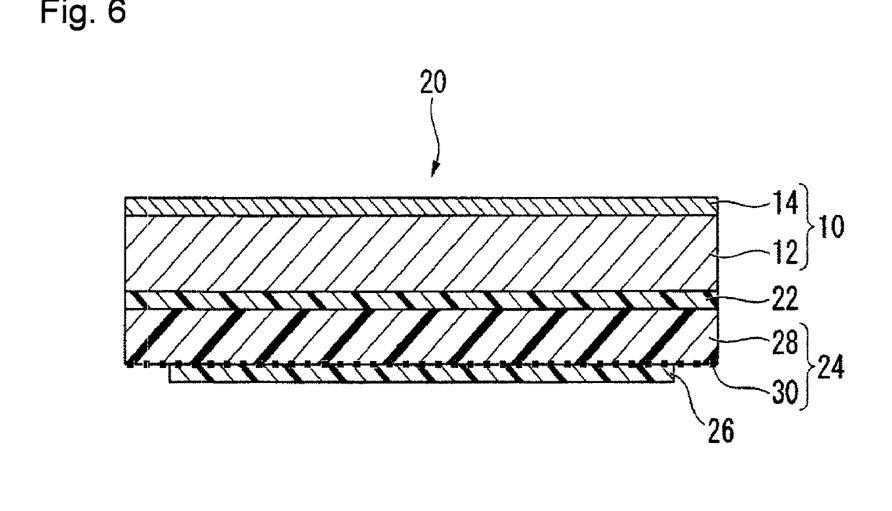
FIG. 6 is a cross-sectional view illustrating a first embodiment of a protective plate for a plasma display of the present invention.

In FIG. 6 is shown a protective plate according to a first embodiment. A protective plate 20 comprises a low reflection glass 10 (support substrate), an electroconductive film 24 bonded to the surface of the glass substrate 12 of the low reflection glass 10 by means of a colored adhesive layer 22, and a protective resin layer 26 formed on the surface of the electroconductive film 24.

The colored adhesive layer 22 is a layer comprising an adhesive having all of near infrared shielding function, color tone correcting function and ultraviolet shielding function.

The adhesive may be a commercially available adhesive. It may, for example, be an adhesive of an acrylate copolymer, polyvinyl chloride, epoxy resin, polyurethane, vinyl acetate copolymer, styrene/acrylic copolymer, polyester, polyamide, polyolefin, styrene/butadiene copolymer rubber, butyl rubber or silicone resin. In the adhesive, a near infrared absorber, a coloring agent and an ultraviolet absorber are incorporated.

The electroconductive film 24 comprises a resin film 28 and an electroconductive mesh layer 30 made of copper formed on the resin film (electroconductive film), and has electromagnetic wave shielding function. Usually, it is produced by bonding a copper oil on the resin film 28, followed by processing into a mesh. The resin film 28 may, for example, be a polyethylene terephthalate (hereinafter referred to as PET) film.

The protective resin layer 26 is formed by coating the surface on the electroconductive mesh layer 30 side of the electroconductive film 24 with a photocuring resin or a thermosetting resin in a predetermined thickness, followed by curing. The resin may, for example, be an acrylic resin, an epoxy resin, a urethane resin or a polyester resin.

Second Embodiment

Figure 7:
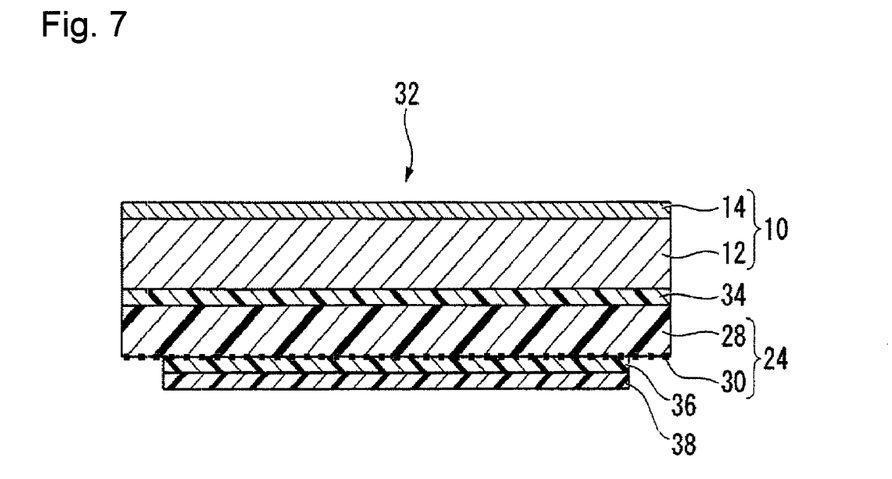
FIG. 7 is a cross-sectional view illustrating a second embodiment of a protective plate for a plasma display of the present invention.

In FIG. 7 is shown a protective plate according to a second embodiment. A protective plate 32 comprises a low reflection glass 10 (support substrate), an electroconductive film 24 bonded to the surface of the glass substrate 12 of the low reflection glass 10 by means of a transparent adhesive layer 34, and a resin film 38 bonded to the surface of the electroconductive film 24 by means of a colored adhesive layer 36.

Here, in the second embodiment, the same structure as in the first embodiment is provided with the same symbol as in FIG. 6 and its description is omitted.

The transparent adhesive layer 34 may have an ultraviolet shielding function. The adhesive may be a commercially available adhesive, and is preferably an acrylic adhesive, a silicone adhesive, a butadiene adhesive, a urethane adhesive or the like. In the adhesive, an ultraviolet absorber may be incorporated.

The colored adhesive layer 36 is a layer comprising an adhesive having both near infrared shielding function and color tone correcting function. In a case where the transparent adhesive layer 34 has no ultraviolet shielding function, the colored adhesive layer 36 further has an ultraviolet shielding function. The adhesive may be a commercially available adhesive, and is preferably an acrylic adhesive, a silicone adhesive, a butadiene adhesive, a urethane adhesive or the like. In the adhesive, a near infrared absorber and a coloring agent are incorporated, and an ultraviolet absorber may further be incorporated.

The resin film 38 may, for example, be a PET film.

Third Embodiment

Figure 8:
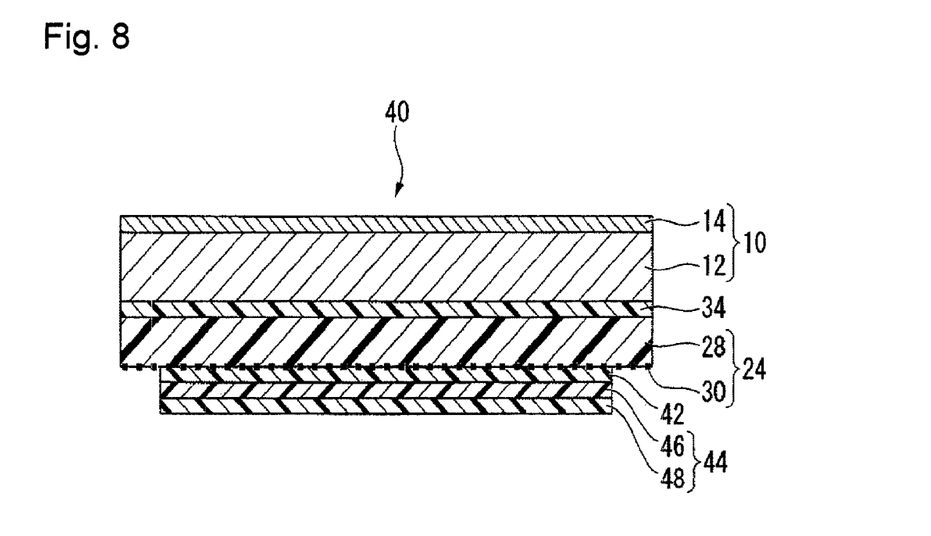
FIG. 8 is a cross-sectional view illustrating a third embodiment of a protective plate for a plasma display of the present invention.

In FIG. 8 is shown a protective plate according to a third embodiment.

A protective plate 40 comprises a low reflection glass 10 (support substrate), an electroconductive film 24 bonded to the surface of the glass substrate 12 of the low reflection glass 10 by means of a transparent adhesive layer 34, and a near infrared shielding film 44 bonded to the surface of the electroconductive film 24 by means of a colored adhesive layer 42.

In the third embodiment, the same structure as in the first or second embodiment is provided with the same symbol as in FIG. 6 or 7, and its description is omitted.

The colored adhesive layer 42 is a layer comprising an adhesive having a color tone correcting function. In a case where the transparent adhesive layer 34 has no ultraviolet shielding function, the colored adhesive layer 42 further has an ultraviolet shielding function. The adhesive may, for example, be a commercially available adhesive, and is preferably an acrylic adhesive, a silicone adhesive, a butadiene adhesive, a urethane adhesive or the like. In the adhesive, a coloring agent is incorporated, and an ultraviolet absorber may further be incorporated.

The near infrared shielding film 44 comprises a resin film 48 and a near infrared shielding coating layer 46 formed on the resin film. The near infrared shielding coating layer 46 is formed by coating the resin film 48 with a coating agent containing a resin and a near infrared absorber, followed by drying. The resin film 48 may, for example, be a PET film.

Fourth Embodiment

Figure 9:
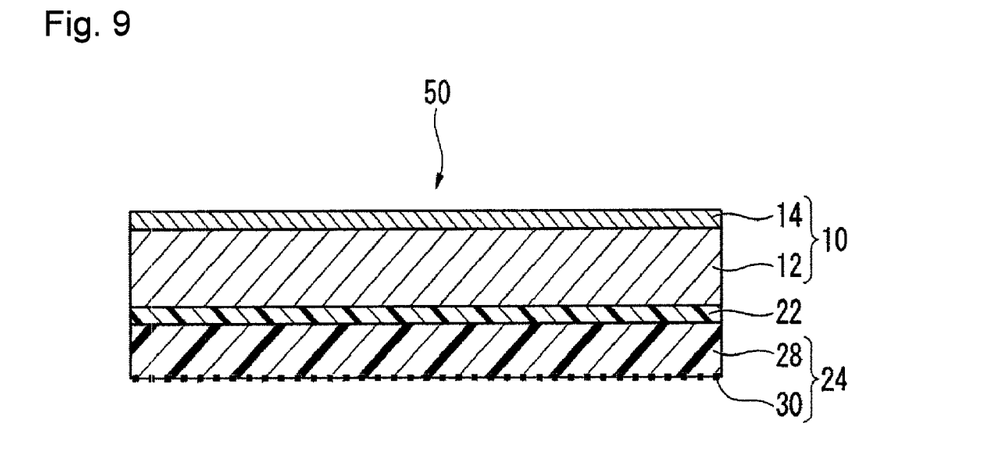
FIG. 9 is a cross-sectional view illustrating a fourth embodiment of a protective plate for a plasma display of the present invention.

In FIG. 9 is shown a protective plate according to a fourth embodiment. A protective plate 50 comprises a low reflection glass 10 (support substrate), and an electroconductive film 24 bonded on the surface of the glass substrate 12 of the low reflection glass 10 by means of a colored adhesive layer 22.

In the fourth embodiment, the same structure as in the first embodiment is provided with the same symbol as in FIG. 6, and its description is omitted.

Fifth Embodiment

Figure 10:
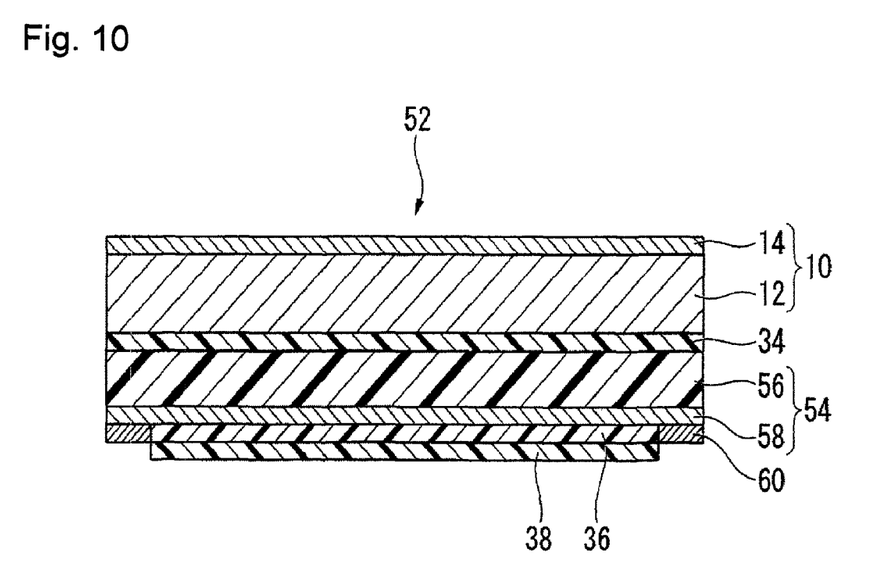
FIG. 10 is a cross-sectional view illustrating a fifth embodiment of a protective plate for a plasma display of the present invention.

In FIG. 10 is shown a protective plate according to a fifth embodiment. A protective plate 52 comprises a low reflection glass 10 (support substrate), an electroconductive film 54 bonded to the surface of the glass substrate 12 of the low reflection glass 10 by means of a transparent adhesive layer 34, an electrode 60 formed around the periphery of the electroconductive film 54, and a resin film 38 bonded to the surface of the electroconductive film 54 by means of a colored adhesive layer 36.

In the fifth embodiment, the same structure as in the second embodiment is provided with the same symbol as in FIG. 7, and its description is omitted.

The electroconductive film 54 comprises a resin film 56 and a conductive film 58 formed on the resin film by the sputtering method, and has both electromagnetic wave shielding function and near infrared shielding function. The electroconductive layer 58 is usually a laminated film alternately having metal oxide layers (an oxide of In and Sn, an oxide of Ti and Zn, an oxide of Al and Zn, niobium oxide, or the like) and metal layers (Ag, a Ag alloy, or the like) with a number of the metal layers of n and a number of the metal oxide layers of n+1 (wherein n is an integer of at least 1). The resin film 56 may, for example, be a PET film.

The electrode 60 is formed by applying a silver paste containing silver, glass frit and a resin or a copper paste containing copper, glass frit and a resin, followed by firing. Otherwise, it may be formed by bonding an aluminum tape provided with an electroconductive adhesive.

Sixth Embodiment

Figure 11:
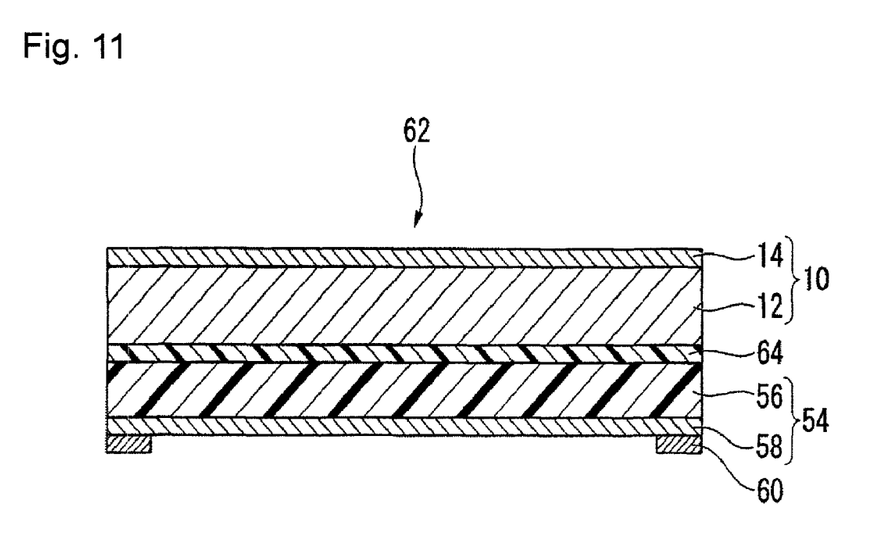
FIG. 11 is a cross-sectional view illustrating a sixth embodiment of a protective plate for a plasma display of the present invention.

In FIG. 11 is shown a protective plate according to a sixth embodiment. A protective plate 62 comprises a low reflection glass 10 (support substrate), an electroconductive film 54 bonded to the surface of the glass substrate 12 of the low reflection glass 10 by means of a colored adhesive layer 64, and an electrode 60 bonded around the periphery of the electroconductive film 54.

In the sixth embodiment, the same structure as in the fifth embodiment is provided with the same symbol as in FIG. 10, and its description is omitted.

The colored adhesive layer 64 is a layer comprising an adhesive having both color tone correcting function and ultraviolet shielding function. The adhesive may be a commercially available adhesive, and is preferably an acrylic adhesive, a silicone adhesive, a butadiene adhesive, a urethane adhesive or the like. In the adhesive, a coloring agent and an ultraviolet absorber are incorporated.

The above-described protective plates 20, 32, 40, 50, 52 and 62, are excellent in the abrasion resistance, the weather resistance, the productivity and the outer appearance, since the low reflection glass 10 excellent in the abrasion resistance, the weather resistance, the productivity and the outer appearance is used as the support substrate.

EXAMPLES

Now, the present invention will be described in further detail with reference to Examples, but the present invention is by no means restricted to such specific Examples.

(Measurement of Content of C Atoms)

The C atom content in the outermost layer 18 was measured by the following method.

Measurement was carried out by using a quadrupole type secondary ion mass spectrometer (SIMS). Specifically, the SIMS depth profile of the concentration of each of Si atoms, C atoms and O atoms relative to the depth of the outermost layer 18, components of the layer adjacent to the outermost layer and components of the substrate was prepared. Then, the average ($I_i$) of the ion intensity of C atoms from a depth of 4 nm to the depth at which the profile of the components of the layer adjacent to the outermost layer appeared in the SIMS depth profile, was calculated. As the primary ion species, $Cs^+$ (cesium cation) was employed. Further, the content of C atoms was calculated from the following formula (1):

$$C \text{ atom content} = (I_i/I_{ref}) \times RSF \tag{1}$$

In the above formula (1), the intensity of O atoms (content: known) in a glass substrate was regarded as the reference ($I_{ref}$) (normalized by the intensity of O atoms).

Further, with respect to a sample of which the C atom content was known (content: Z mol %), RSF was calculated by the following formula (2) from the ion intensity ($I_{iZ}$) of C atoms obtained by SIMS and the intensity ($I_{ref}$) of O atoms in the glass substrate:

$$RFS = (Z/I_{iZ}) \times I_{ref} \tag{2}$$

First a sample was subjected to measurement by negative detection, and with respect to a sample of which the obtained C atom content was at most 1 mol %, the content was regarded as the C atom content. In the measurement by the negative detection, as the sample of which the C atom content was known, a standard sample having C atoms ion-implanted in a $SiO_2$ film was used to calculate the RSF value.

In the negative detection employing SIMS, in a case where the C atom content exceeds 1%, reliability of the obtained data is low. Accordingly, with respect to a sample of which the content exceeded 1%, the ion intensity of C atoms was measured by the same method as the above measurement employing SIMS except that positive detection was employed, to calculate the C atom content. In the positive detection, as the sample of which the content of C atoms was known, a sample having a C atom content of 13.2% as a result of X-ray photoelectron spectroscopy (XPS) was used to calculate the RSF value. With respect to a sample of which the C atom content obtained by the positive detection employing SIMS exceeded 1% and was at most 5%, the content was regarded as the C atom content.

In the measurement by the positive detection employing SIMS, in a case where the C atom content exceeds 5%, the reliability of the obtained data is low, and accordingly with respect to a sample of which the content exceeded 5%, the C atom content was measured by X-ray photoelectron spectroscopy (XPS).

(Evaluation of Abrasion Resistance)

Using a continuous loading scratching intensity tester (manufactured by Shinto Scientific Co., Ltd., HEIDON TRIBOGEAR TYPE 18, needle: 0.1 mm), the scratch start load on the surface of the antireflection film was measured.

In the evaluation of the abrasion resistance in the present invention, the scratch start load varies depending on the state of the needle attached to the continuous loading scratching intensity tester. Accordingly, evaluation was carried out by using the same needle and relatively comparing the values of the scratch start load of samples measured substantially at the same time. In these Examples, in Examples 1 and 2 and Comparative Examples 1 to 4, the same needle was used, and the measurement was carried out substantially at the same time. Further, in Examples 3 and 4 and Comparative Examples 5 to 7, the same needle was used, and the measurement was carried out substantially at the same time.

(Measurement of Spectral Curve of Reflectance)

Using a spectrophotometer (manufactured by Hitachi High-Technologies Corporation, U4100), the one side reflectance on a surface on which an antireflection film was formed of the obtained low reflection glass against light having a wavelength of from 380 to 780 nm was measured.

Example 1

An in-line sputtering apparatus comprising two or more chambers was evacuated of air to $1 \times 10^{-5}$ Torr or below, a mixed gas of Ar and $N_2$ ($Ar/N_2 = 93/7$ flow ratio (volume ratio, the same applied hereinafter)) was introduced to a first chamber, a mixed gas of Ar and $CO_2$ ($Ar/CO_2 = 3/7$ flow ratio) was introduced to a second chamber, and the flow rates of the respective mixed gases were adjusted so that the pressure in the respective chambers was $3 \times 10^{-3}$ Torr.

A soda lime silica glass of 1 m×0.7 m×3.2 mm in thickness was washed with water, dried and placed in the first chamber of the sputtering apparatus, and DC magnetron sputtering was carried out by using a Ti metal target disposed in the first chamber to form an interlayer comprising $TiN_x$ on the soda lime silica glass. With respect to the extinction coefficient $K_2$ and the refractive index $n_2$ of the formed interlayer comprising $TiN_x$, $0.1 \leq K_2 \leq 2.4$ and $0.5 \leq n_2 \leq 2.5$ at a wavelength of from 380 to 780 nm, and $K_{2p} < K_{2q}$ and $n_{2p} > n_{2q}$ were satisfied, where the extinction coefficients $K_2$ at wavelengths of p and q which satisfy $380 \text{ nm} \leq p < q \leq 780 \text{ nm}$ are $K_{2p}$ and $K_{2q}$, respectively, and the refractive indices $n_2$ at wavelengths of p and q are $n_{2p}$ and $n_{2q}$, respectively. That is, the interlayer in Example 1 was the layer (b). Then, the soda lime silica glass was moved to the second chamber, and AC magnetron sputtering was carried out by using a Si target disposed in the second chamber to form an outermost layer which is a layer (hereinafter referred to as a SiCO layer) containing Si atoms, C atoms and O atoms on the interlayer. This outermost layer was a layer containing $SiO_2$ as the main component.

Figure 12:
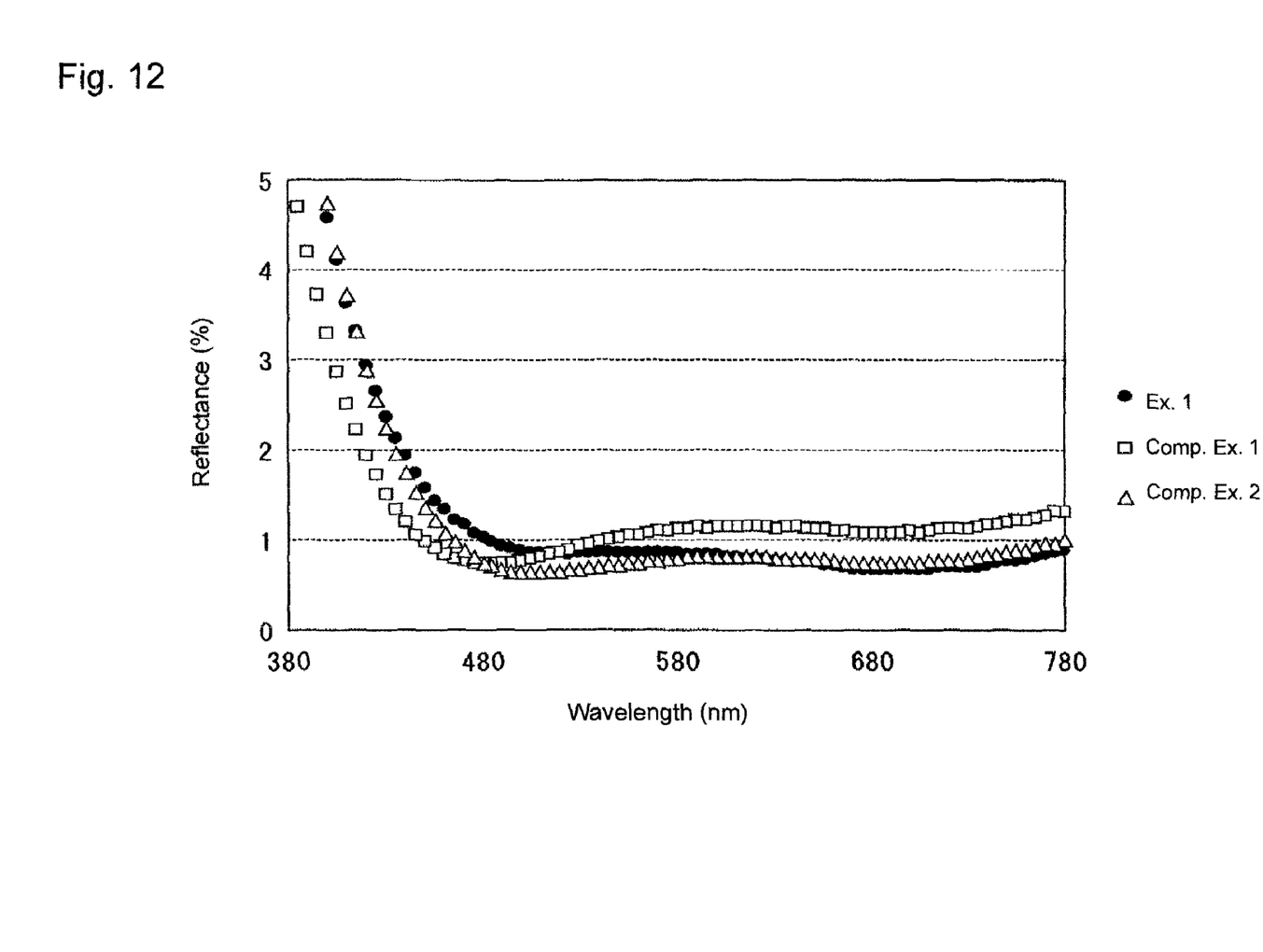
FIG. 12 illustrates spectral curves of one side reflectances on a side on which an antireflection film is formed of low reflection glasses in Example 1 and Comparative Examples 1 and 2.

The film thicknesses of the respective layers of the antireflection film, the refractive index of the outermost layer, the content of C atoms in the outermost layer, and abrasion resistances 3 to 4 hours, and 4 to 5 days after film deposition of the antireflection film, are shown in Table 1. Further, the spectral curve of the one side reflectance on the side on which the antireflection film was formed of the low reflection glass is shown in FIG. 12. Further, the luminous reflectance is shown in Table 1.

Example 2

The same sputtering apparatus as in Example 1 was evacuated of air to $1 \times 10^{-5}$ Torr or below, a mixed gas of Ar and $O_2$ ($Ar/O_2=2/8$: flow ratio) was introduced to the first chamber, a mixed gas of Ar and $CO_2$ ($Ar/CO_2=3/7$: flow ratio) was introduced to the second chamber, and the flow rates of the respective mixed gases were adjusted so that the pressure in the respective chambers was $3 \times 10^{-3}$ Torr.

A soda lime silica glass of 1 m×0.7 m×3.2 mm in thickness was washed with water, dried and placed in the first chamber of the sputtering apparatus, and DC magnetron sputtering was carried out by using a Ti metal target disposed in the first chamber to form an interlayer comprising $TiO_y$ on the soda lime silica glass. Of the formed interlayer ($TiO_y$), the extinction coefficient $K_1$ was 0, and the refractive index $n_1$ was 2.45. That is, the interlayer in Example 2 was the layer (a). Then, the soda lime silica glass was moved to the second chamber, and AC magnetron sputtering was carried out by using a Si target disposed in the second chamber to form an outermost layer which is a SiCO layer on the interlayer. The outermost layer was a layer containing $SiO_2$ as the main component.

Figure 13:
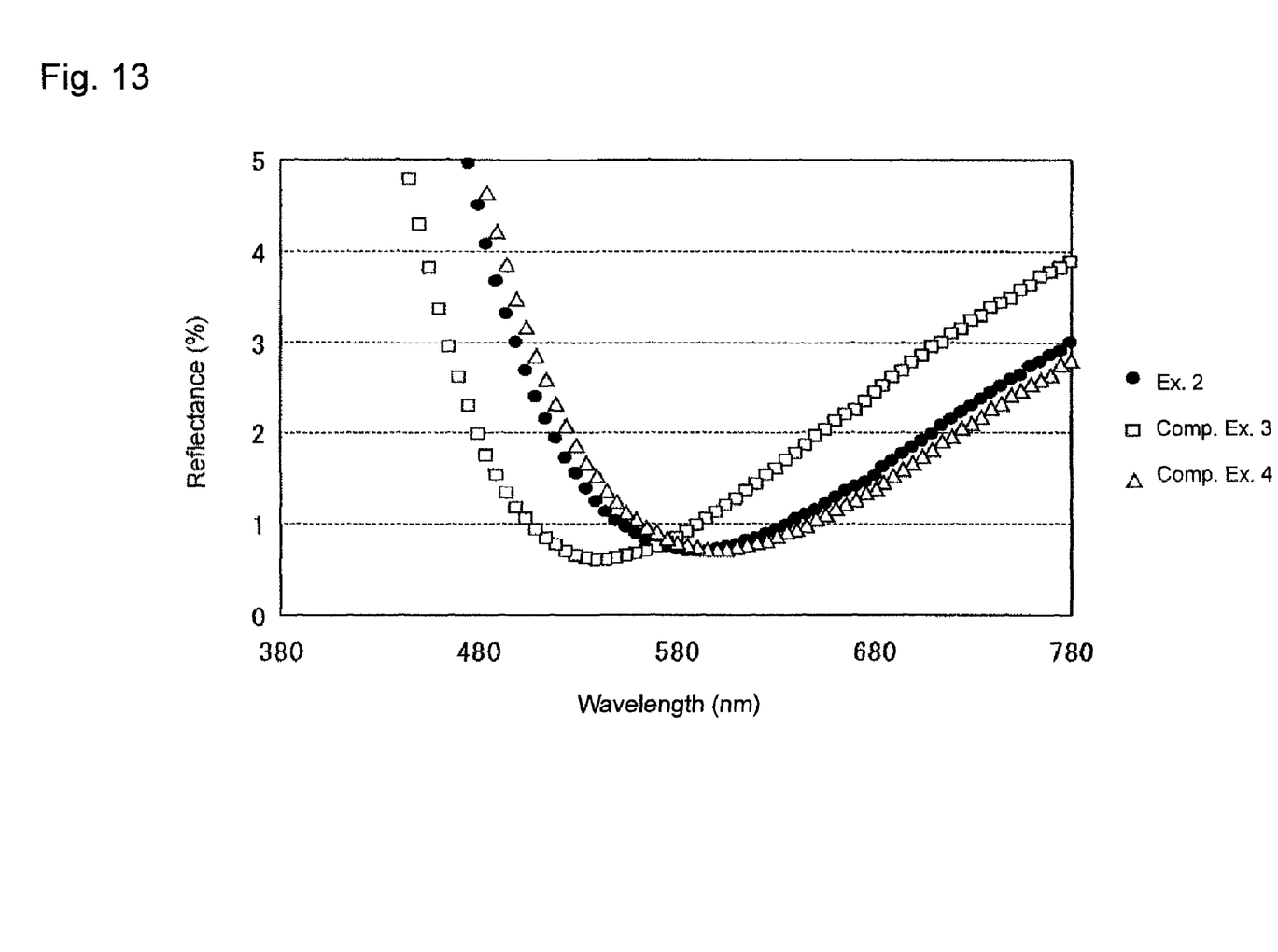
FIG. 13 illustrates spectral curves of one side reflectances on a side on which an antireflection film is formed of low reflection glasses in Example 2 and Comparative Examples 3 and 4.

The film thicknesses of the respective layers in the antireflection film, the refractive index of the outermost layer, the content of C atoms in the outermost layer, and the abrasion resistances 3 to 4 hours and 4 to 5 days after film deposition of the antireflection film are shown in Table 1. Further, the spectral curve of the one side reflectance on the side on which the antireflection film was formed of the low reflection glass is shown in FIG. 13. Further, the luminous reflectance is shown in Table 1.

Comparative Examples 1 and 2

An interlayer comprising $TiN_x$ and an outermost layer comprising $SiO_2$ containing no C were formed in the same manner as in Example 1 except that the mixed gas introduced to the second chamber was changed to a mixed gas of Ar and $O_2$.

The film thicknesses of the respective layers in the antireflection film, the refractive index of the outermost layer, the content of C atoms in the outermost layer, and the abrasion resistances 3 to 4 hours and 4 to 5 days after film deposition of the antireflection film are shown in Table 1. Further, the spectral curve of the one side reflectance on the side on which the antireflection film was formed of the low reflection glass is shown in FIG. 12. Further, the luminous reflectance is shown in Table 1.

Comparative Examples 3 and 4

An interlayer comprising $TiO_y$ and an outermost layer comprising $SiO_2$ containing no C were formed in the same manner as in Example 2 except that the mixed gas introduced to the second chamber was changed to a mixed gas of Ar and $O_2$.

The film thicknesses of the respective layers in the antireflection film, the refractive index of the outermost layer, the content of C atoms in the outermost layer, and the abrasion resistances 3 to 4 hours and 4 to 5 days after film deposition of the antireflection film are shown in Table 1. Further, the spectral curve of the one side reflectance on the side on which the antireflection film was formed of the low reflection glass is shown in FIG. 13. Further, the luminous reflectance is shown in Table 1.

Example 3

An interlayer comprising $TiN_x$ and an outermost layer which is a SiCO layer were formed in the same manner as in Example 1 except that a mixed gas of Ar and $CO_2$ ($Ar/CO_2=0/10$: flow ratio) was used as the mixed gas introduced to the second chamber.

Figure 14:
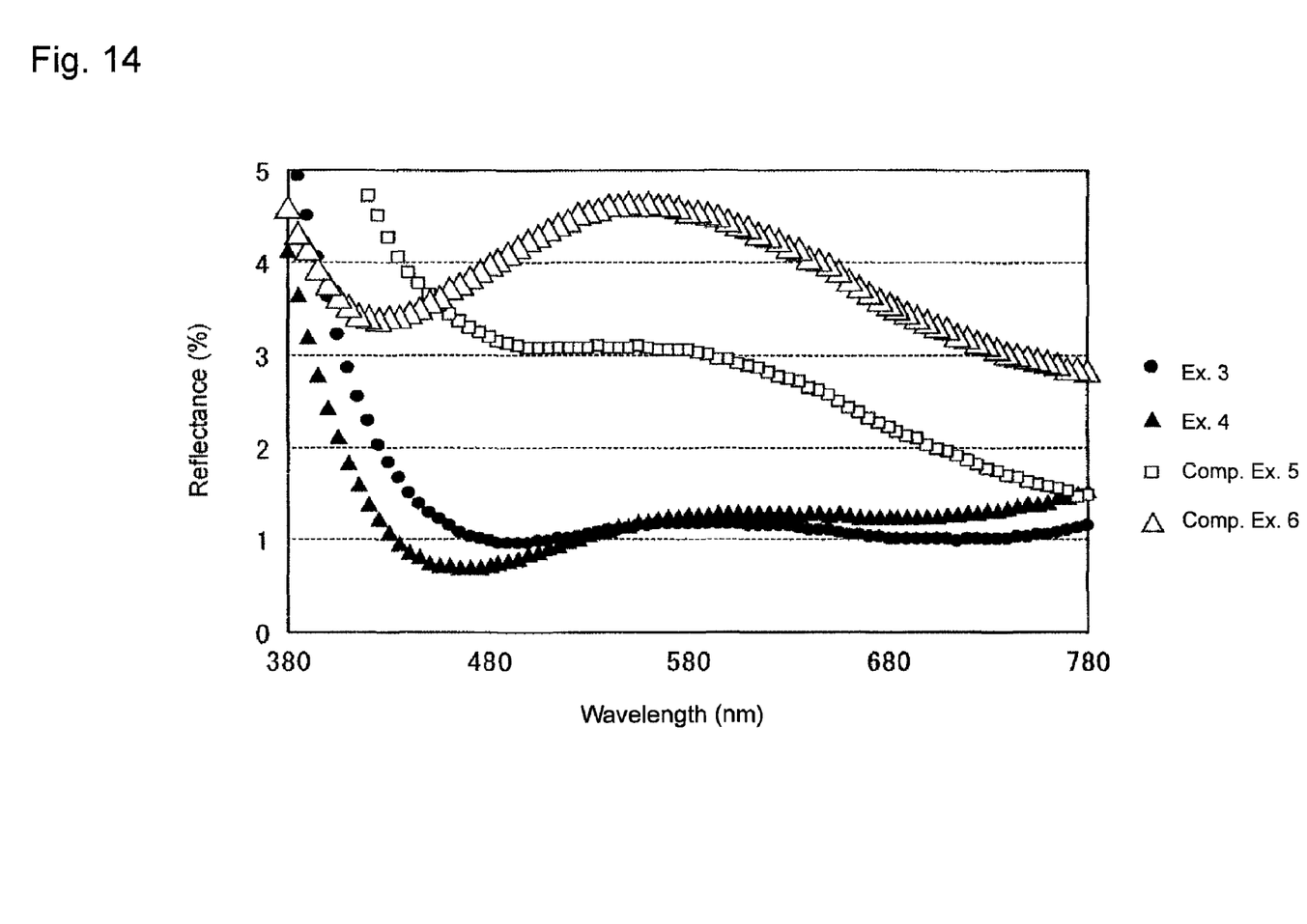
FIG. 14 illustrates spectral curves of one side reflectances on a side on which an antireflection film is formed of low reflection glasses in Examples 3 and 4 and Comparative Examples 5 and 6.

The film thicknesses of the respective layers in the antireflection film, the refractive index of the outermost layer, the content of C atoms in the outermost layer, and the abrasion resistance 4 to 5 days after film deposition of the antireflection film are shown in Table 1. Further, the spectral curve of the one side reflectance on the side on which the antireflection film was formed of the low reflection glass is shown in FIG. 14. Further, the luminous reflectance is shown in Table 1.

Example 4

An interlayer comprising $TiN_x$ and an outermost layer which is a SiCO layer were formed in the same manner as in Example 1 except that a mixed gas of Ar and $CO_2$ ($Ar/CO_2=2/8$: flow ratio) was used as the mixed gas introduced to the second chamber.

The film thicknesses of the respective layers in the antireflection film, the refractive index of the outermost layer, the content of C atoms in the outermost layer, and the abrasion resistance 4 to 5 days after film deposition of the antireflection film are shown in Table 1. Further, the spectral curve of the one side reflectance on the side on which the antireflection film was formed of the low reflection glass is shown in FIG. 14. Further, the luminous reflectance is shown in Table 1.

Comparative Example 5

An interlayer comprising $TiN_x$ and an outermost layer which is a SiCO layer were formed in the same manner as in Example 1 except that a mixed gas of Ar and $CO_2$ ($Ar/CO_2=35/65$: flow ratio) was used as the mixed gas introduced to the second chamber.

The film thicknesses of the respective layers in the antireflection film, the refractive index of the outermost layer, the content of C atoms in the outermost layer, and the abrasion resistance 4 to 5 days after film deposition of the antireflection film are shown in Table 1. Further, the spectral curve of the one side reflectance on the side on which the antireflection film was formed of the low reflection glass is shown in FIG. 14. Further, the luminous reflectance is shown in Table 1.

Comparative Example 6

An interlayer comprising $TiN_x$ and an outermost layer which is a SiCO layer were formed in the same manner as in Example 1 except that a mixed gas of Ar and $CO_2$ (Ar/$CO_2$=40/60: flow ratio) was used as the mixed gas introduced to the second chamber.

The film thicknesses of the respective layers in the antireflection film, the refractive index of the outermost layer, the content of C atoms in the outermost layer, and the abrasion resistance 4 to 5 days after film deposition of the antireflection film are shown in Table 1. Further, the spectral curve of the one side reflectance on the side on which the antireflection film was formed of the low reflection glass is shown in FIG. 14. Further, the luminous reflectance is shown in Table 1.

Comparative Example 7

An interlayer comprising $TiN_x$ and an outermost layer comprising $SiO_2$ containing no C were formed in the same manner as in Example 1 except that the gas introduced to the second chamber was changed to $O_2$ gas.

The film thicknesses of the respective layers in the antireflection film, the refractive index of the outermost layer, the content of C atoms in the outermost layer, and the abrasion resistance 4 to 5 days after film deposition of the antireflection film are shown in Table 1. Further, the luminous reflectance is shown in Table 1.

Example 5

Example for Preparation of Protective Plate for Plasma Display

A protective plate for a plasma display as shown in FIG. 10 was prepared by using the low reflection glass prepared in Example 1.

<Preparation of Sputtering Target>

Starting materials ZnO powder and $TiO_2$ powder were weighed in a molar ratio of ZnO:$TiO_2$=90/10 and wet mixed in a ball mill mixer for 24 hours, the mixture was dried by an evaporator, the dried product was pulverized by a juicer mixer and filtered through a sieve of 200 mesh to prepare a starting material powder the particle size of which was adjusted. A graphite mold was filled with the obtained starting material powder, which was sintered under pressure by using a resistant heat type hot pressing apparatus employing an argon gas as an atmospheric gas at a temperature-raising rate of 350° C./hr at a maximum temperature of 1,150° C. for a maximum temperature-retention time of 2 hours under a pressure of 99 MPa (gauge pressure) to obtain a sputtering target containing ZnO and $Zn_2TiO_4$ as the main components. The contents (molar ratio) of ZnO and $Zn_2TiO_4$ were calculated from the charge ratio of starting materials ZnO and $TiO_2$, whereupon ZnO:$Zn_2TiO_4$=88:12.

Figure 15:
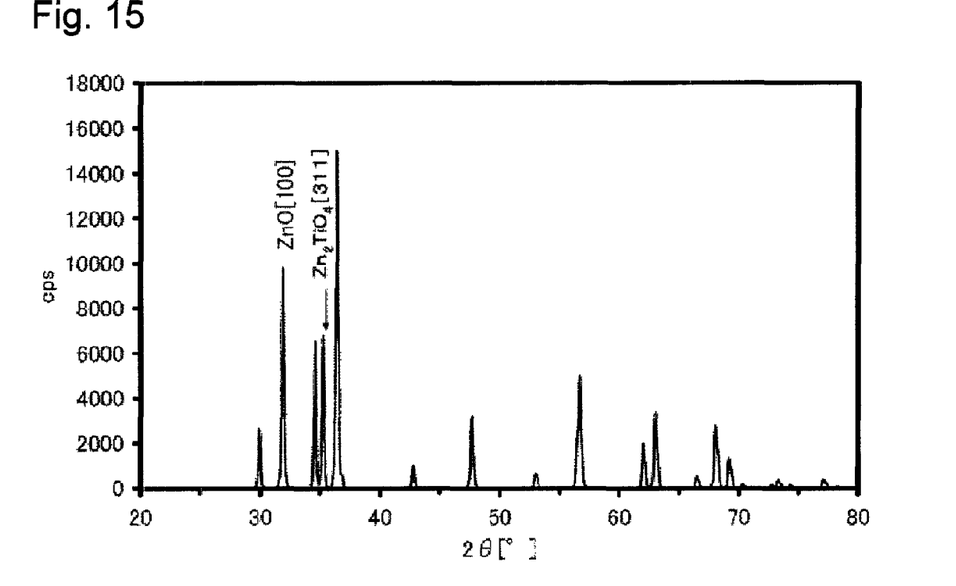
FIG. 15 is a powder X-ray diffraction pattern of a sputtering target obtained in Example 15.

The powder X-ray diffraction of the sputtering target was measured. As the measuring method, first, the sputtering target was formed into a powder by a pestle and a motar, the powder was put in a container for X-ray diffraction measurement of 15 mm×15 mm×1 mm t (thickness), and measurement was carried out within a range of 20°<2θ<80° by using an X-ray diffraction apparatus manufactured by Mac Science. The obtained data of the powder X-ray diffraction of the sputtering target are shown in FIG. 15. As shown in FIG. 15, only a peak derived from ZnO and a peak derived from $Zn_2TiO_4$ appeared, and no peak derived from $TiO_2$ appeared. This indicates that the composition of the target comprises ZnO and $Zn_2TiO_4$. As a result of the powder X-ray diffraction measurement, the integrated intensity of ZnO [100] in the vicinity of 2θ=31.7° was 116,966 [cps], the integrated intensity of $Zn_2TiO_4$[311] in the vicinity of 2θ=35.2° was 76,676 [cps], and the ratio was 60%.

<Preparation of Electroconductive Film>

On one surface of a polyethylene terephthalate film (PET film) having a thickness of 100 μm as a substrate, four layers of laminated films each having a metal oxide layer A and a metal layer laminated in this order were formed, and a metal oxide layer A was formed as the outermost layer to form a conductive film on the surface of the PET film thereby to obtain an electrically conductive film.

That is, the structure of the conductive film was such that in order from the substrate, a metal oxide layer A1 (film thickness: 40 nm), a metal layer 1 (film thickness: 10 nm), a metal oxide layer A2 (film thickness: 80 nm), a metal layer 2 (film thickness: 10 nm), a metal oxide layer A3 (film thickness: 80 nm), a metal layer 3 (film thickness: 10 nm), a metal oxide layer A4 (film thickness: 80 nm), a metal layer 4 (film thickness: 10 nm) and a metal oxide layer A5 (film thickness: 40 nm). The total film thickness of the laminated film was 360 nm.

The metal oxide layers A were formed by DC sputtering using the above sputtering target. The film deposition conditions were such that while a mixed gas comprising 95 vol % of an argon gas and 5 vol % of an oxygen gas was introduced to the DC sputtering apparatus, the pressure and the charged electric power were constant under 0.42 Pa (gauge pressure) at 3.75 W/cm², respectively. The film deposition time was such that the film thickness of the layers A1 and A5 was 40 nm, and the film thickness of the layers A2, A3 and A4 was 80 nm.

The metal layers are a film comprising 99 at % of silver and 1 at % of gold. The metal layers were formed by DC sputtering using sputtering targets of silver and gold to achieve a desired composition. The film deposition conditions were such that while an argon gas was introduced to the DC sputtering apparatus, the pressure and the charged electric power were constant under 0.42 Pa (gauge pressure) at 2.5 W/cm², respectively. The film deposition time was such that the film thickness was 10 nm.

<Preparation of Protective Plate for Plasma Display>

On the surface of the PET film (resin film 56) side of the obtained electroconductive film 54, a transparent adhesive layer 34 (acrylic adhesive, thickness: 25 μm) was formed.

The low reflection glass 10 prepared in Example 1 was cut into a predetermined size, chamfered and cleaned, and then heated to 660° C., and then air-cooled to conduct glass tempering treatment.

On the side on which no antireflection film 14 was formed of the low reflection glass 10, the electroconductive film 54 was bonded by means of the above transparent adhesive layer 34. Then, for the purpose of protecting the electroconductive film 58, a resin film 38 (manufactured by TOYOBO CO., LTD, tradename: A4100) was bonded on the surface of the electroconductive film 58 by means of a colored adhesive layer 36 (acrylic adhesive, thickness: 25 μm). Further, for the purpose of forming electrodes, portions (electrode forming portions) on which no resin film was bonded were left around the periphery of the electroconductive film.

Then, on the electrode forming portions, a silver paste (manufactured by TAIYO INK MFG. CO., LTD., tradename: AF4810) was screed printed by a nylon mesh #180 with an emulsifiable concentrate thickness of 20 μm and dried in a circulating hot air oven at 85° C. for 35 minutes to form electrodes 60.

TABLE 1

| | Interlayer | | Outermost layer | | | Scratch start load (g) | | Luminous reflectance (%) |
| | TiO$_y$ | TiN$_x$ | | | | | | |
| | Film thickness (nm) | Film thickness (nm) | Film thickness (nm) | Refractive index | C content (mol %) | 3 to 4 hours later | 4 to 5 days later | |
|---|---|---|---|---|---|---|---|---|
| Ex. 1 | — | 7 | 87.2 | 1.474 | 1.1 | 57.6 | 348.2 | 0.862 |
| Comp. Ex. 1 | — | 7 | 80.6 | 1.472 | 0.055 | 5.6 | 127.6 | 1.01 |
| Comp. Ex. 2 | — | 7 | 86.1 | 1.472 | 0.055 | 4.8 | 106.6 | 0.748 |
| Ex. 2 | 14 | — | 125.3 | 1.470 | 1.1 | 15.4 | 225.2 | 1.44 |
| Comp. Ex. 3 | 14 | — | 113.9 | 1.472 | 0.055 | 6.2 | 95.2 | 0.991 |
| Comp. Ex. 4 | 14 | — | 125.6 | 1.473 | 0.055 | 4.6 | 101.8 | 1.64 |
| Ex. 3 | — | 7 | 84.7 | 1.478 | 0.6 | — | 109.3 | 1.13 |
| Ex. 4 | — | 7 | 84.8 | 1.485 | 1.6 | — | 138.6 | 1.10 |
| Comp. Ex. 5 | — | 7 | 85.2 | 1.562 | 9.2 | — | 115.7 | 3.03 |
| Comp. Ex. 6 | — | 7 | 84.8 | 1.618 | 12.2 | — | 53.4 | 4.46 |
| Comp. Ex. 7 | — | 7 | 82.5 | 1.477 | 0.055 | — | 48.3 | 2.66 |

INDUSTRIAL APPLICABILITY

The low reflection glass of the present invention is useful as a protective plate for a plasma display, a low reflection glass for a liquid crystal display, a low reflection glass for an organic EL display, a cover glass for a solar battery, a glass for an automobile, a glass for a railway vehicle, a glass for shipping, a glass for a building material, etc.

The entire disclosure of Japanese Patent Application No. 2008-113857 filed on Apr. 24, 2008 including specification, claims, drawings and summary is incorporated herein by reference in its entirety.

MEANINGS OF SYMBOLS

| | |
|---|---|
| 10: | low reflection glass |
| 10a: | low reflection glass |
| 10b: | low reflection glass |
| 10c: | low reflection glass |
| 10d: | low reflection glass |
| 12: | glass substrate |
| 14: | antireflection film |
| 14a: | antireflection film |
| 14b: | antireflection film |
| 14c: | antireflection film |
| 14d: | antireflection film |
| 16: | interlayer |
| 16a: | layer (a) |
| 16b: | layer (b) |
| 18: | outermost layer |
| 20: | protective plate |
| 30: | electroconductive mesh layer (conductive film) |
| 32: | protective plate |
| 40: | protective plate |
| 50: | protective plate |
| 52: | protective plate |
| 58: | conductive film |
| 62: | protective plate |

What is claimed is:

1. A low reflection glass comprising a glass substrate and an antireflection film formed on the surface of the glass substrate, wherein the antireflection film comprises an interlayer and an outermost layer disposed in this order from the glass substrate side; and the outermost layer is a layer containing Si atoms, C atoms and O atoms, the content of C atoms being from 0.5 to 3 mol % based on 100 mol % of the total amount of Si atoms, C atoms and O atoms, and the interlayer is the following layer (a) having an extinction coefficient $K_1$ at a wavelength of from 380 to 780 nm of $0 \leq K_1 < 0.1$ and a refractive index $n_1$ at a wavelength of 550 nm of $2.0 \leq n_1 \leq 2.5$.

2. The low reflection glass according to claim 1, wherein the outermost layer is a layer containing $SiO_2$ as the main component.

3. The low reflection glass according to claim 1, wherein the outermost layer has a refractive index of at least 1.45 and less than 1.5 at a wavelength of 550 nm.

4. The low reflection glass according to claim 1, wherein the layer (a) contains Ti atoms and O atoms as the main components, and the proportion of Ti atoms and O atoms is $TiO_y$, wherein y is from 1.9 to 2.0.

5. The low reflection glass according to claim 2, wherein the layer (a) contains Ti atoms and O atoms as the main components, and the proportion of Ti atoms and O atoms is $TiO_y$, wherein y is from 1.9 to 2.0.

6. The low reflection glass according to claim 3, wherein the layer (a) contains Ti atoms and O atoms as the main components, and the proportion of Ti atoms and O atoms is $TiO_y$, wherein y is from 1.9 to 2.0.

7. A protective plate for a display, comprising the low reflection glass as defined in claim 1.

8. A protective plate for a plasma display, comprising a support substrate comprising the low reflection glass as defined in claim 1, and a conductive film provided on a side on which no antireflection film is formed of the support substrate.

* * * * *